United States Patent [19]
Berthozat et al.

[11] Patent Number: 5,426,283
[45] Date of Patent: Jun. 20, 1995

[54] CHIP CARD CUSTOMIZING MACHINE

[75] Inventors: Michel Berthozat, Les Milles; Paul Morgavi, La Ciotat, both of France

[73] Assignee: Gemplus Card International, Gemenos, France

[21] Appl. No.: 50,494

[22] PCT Filed: Nov. 13, 1991

[86] PCT No.: PCT/FR91/00892
§ 371 Date: May 13, 1993
§ 102(e) Date: May 13, 1993

[87] PCT Pub. No.: WO92/09052
PCT Pub. Date: May 29, 1992

[30] Foreign Application Priority Data

Nov. 16, 1990 [FR] France ............... 90 14329

[51] Int. Cl.⁶ ............................................. G06K 5/00
[52] U.S. Cl. ................................... 235/380; 235/492
[58] Field of Search ............... 235/380, 375, 432, 434, 235/492; 369/223; 400/120 HE

[56] References Cited

U.S. PATENT DOCUMENTS

| | | | |
|---|---|---|---|
| 4,423,425 | 12/1983 | Reese et al. | 346/76 |
| 4,731,524 | 3/1988 | Brooks | 235/432 |
| 5,091,618 | 2/1992 | Takahashi | 235/492 X |
| 5,126,548 | 6/1992 | Sekiguchi | 235/380 X |
| 5,135,095 | 8/1992 | Kocznar et al. | 235/380 X |

FOREIGN PATENT DOCUMENTS

| | | | |
|---|---|---|---|
| 3232000 | 3/1983 | Germany | 400/120 HE |
| 58-036476 | 3/1983 | Japan | 400/120 HE |
| 61-029577 | 2/1986 | Japan | 400/120 HE |
| 62-028276 | 2/1987 | Japan | 400/120 HE |
| 62-042853 | 2/1987 | Japan | 400/120 HE |
| 62-202761 | 9/1987 | Japan | 400/120 HE |
| WO92/16947 | 10/1992 | WIPO . | |

Primary Examiner—Donald Hajec
Assistant Examiner—Jeffrey R. Filipek
Attorney, Agent, or Firm—Nilles & Nilles

[57] ABSTRACT

The invention relates to a machine for the electrical and graphic customization of chip cards. Instead of a standard thermal print head which is applied flat against the card to be printed on and then requires the bending of the chip card during the printing, a vertical print head (120) is used, the heating elements of this vertical print head being arranged on the edge of a thin vertical support. The card (116) can be shifted in a flat position and in an unbent state beneath this head during the graphical printing. It is then delivered, while still in a flat position, to a standard chip card reader (150) in which the electrical customization is done. The cards are not damaged, the mechanical features are greatly simplified and there is no risk of mixing up the graphic and electrical data corresponding to several different cards.

20 Claims, 3 Drawing Sheets

CHIP CARD CUSTOMIZING MACHINE

BACKGROUND OF THE INVENTION

It is increasingly being sought to customize chip cards, not only by the recording,, in a non-volatile memory, of specific information elements relating to the user, but also by the printing, on the external visible part of the card, of specific indications or designs relating to the user.

For example, it is possible to envisage a case where the card contains data elements for the identification of a person while the external surface of the card comprises the name and address of the person, his photograph, corporate identification symbol etc.

The chip cards used in present-day technology have a thickness that cannot be less than about 1 to 2 millimeters, since it is necessary to provide for the thickness of the integrated circuit chip, its coating, the electrical connector that will enable the connection of the chip with a card reader, etc.

It has been observed that this non-negligible thickness raises problems with commonly used printing technologies.

Furthermore, it has been observed that it is extremely desirable to carry out the electrical customization of the chip at the same time as the graphic customization of the external surface of the card, i.e. it is desirable to have a single machine to carry out both types of customization at the same time. This averts the risks of the mixing of information elements, for example the assigning of electrical customization data elements that have nothing to do with the graphic data elements printed on the card.

In the prior art, there are automatic machines made of up two parts: an electrical head used to record electrical data (electrical customizing) and a graphic print head working by heat transfer, from a ribbon, for the graphic customizing of the exterior of the card. A machine such as this is described, for example, in the document EP-A-0 266 926 but, in this case, the graphic customization is done by embossing. Another document EP-A-0 027 886 describes a machine for purely graphic customizing by printing.

In these machines, the print heads comprise, on a plane surface, a line of thermal printing dots (elementary heating dots). These heating dots can be applied to the surface of the card, with the interposition of an inking ribbon between the heating dots and the card. Depending on the dots that are actually heated at the time of the printing, a line of inking dots is transferred thermally from the ribbon to the card. A customized pattern (of designs or written characters) can thus be printed line by line on the card.

However, there is a risk that the contact surface of the thermal print head may not be applied properly against the surface of the card if said card shows defects of planeity. This is why it is necessary, in currently used machines, to provide for the bending of the card at the position of the printing, the bending being done in a direction such that the line of dots of the print head is aligned along a generatrix of the cylinder formed by the bent card, and the convexity of the bend being pointed towards the print head side. This enables the line of dots to be applied accurately along this generatrix to print a line of desired dots; after this, the operation passes to a following printing line, the bent card being shifted with respect to the head in such a way that the print head is always on a generatrix of the cylinder formed by the bent card.

For the chip cards, the thickness of the cards is great enough to make it difficult to obtain this bending without setting up excessive strains in the body of the card. These strains may affect not only the plastic material of the card but also the electrical functions of the card, if only because there is a risk of breakage of internal connections between the chip and the connector used to place it in contact with a card reader.

The mechanical equipment needed to obtain a bending of the card is complicated and hence costly.

Furthermore, this mechanical bending equipment is incompatible with the making of the electrical connections with the chip with a view to the electrical customization of the card. Now, it is sought to carry out the electrical customizing simultaneously with the graphic printing, or immediately before or after, notably before inserting a new card facing the print head.

The mechanical bending system has other drawbacks such as, for example, the fact that it practically rules out the possibility of providing for a structure in which the card enters and comes out by the same orifice of the machine. It is necessary to provide for one entry orifice and one exit orifice. And this entails providing for a special electrical reading head system (a reading head capable of being lowered to carry out the customization and then of being raised to let the card pass through towards the exit).

Finally, it has been observed that it is relatively difficult to control the existing machines in order to give good printing results in certain cases, notably when the inserted cards are already printed (by offset or silk screen printing), which can take place even before customization.

OBJECTS AND SUMMARY OF THE INVENTION

To avert the drawbacks of the prior art, the present invention proposes an automatic machine for the graphic and electrical customization of chip cards or magnetic cards having the following main special features:

- the graphic print head is a so-called vertical print head (the main heating elements of which are located on the edge of a thin support and not on the main plane surface of this support),
- the print head is mounted on means (a movable saddle) that can be used to raise it or lower it perpendicularly to the surface of the card,
- the apparatus is provided with means to shift the card in a flat position line by line beneath the print head and to bring it into a card reader provided with means to carry out the electrical customizing operation.

It is possible notably to use a standard type of chip card reader with frictionless insertion.

The vertical head is preferably mounted in a pivoting state so that the edge which bears the heating elements can be applied accurately throughout its length against the card.

The edge of the thin support which bears the heating elements preferably has rounded edges.

Preferably, there is only one line of heating elements on the edge.

The machine is preferably organized so that the cards enter and come out by one and the same insertion slot.

The customized printing can be done before or after the electrical customization, but the two operations are preferably carried out successively without the card's coming out of the machine. It is also possible to envisage a case where the two operations are carried out simultaneously, but this means that the graphic print head would be shifted line by line with respect to the card while said card is inserted into the reader and undergoes the electrical customization.

BRIEF DESCRIPTION OF THE DRAWINGS

Other characteristics and advantages of the invention will appear from the following detailed description, made with reference to the appended drawings, of which.

DETAILED DESCRIPTION OF THE PREFERRED EMBODIMENTS

Figure 1:
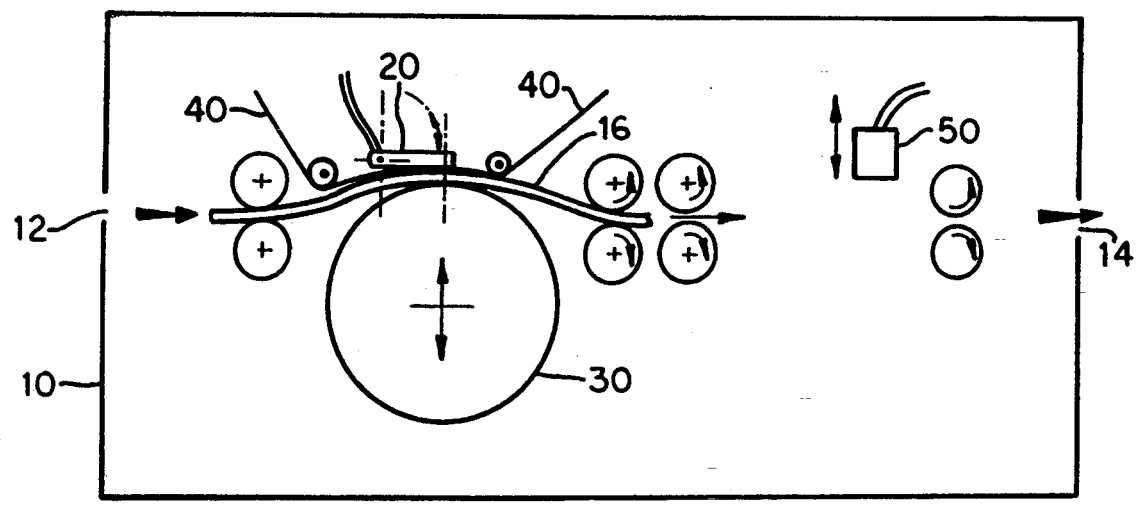
FIG. 1 shows a schematic view of a prior art customizing machine.

As can be seen in FIG. 1, the prior art graphic and electrical customizing machines require a complicated mechanical system to bend the chip card during the printing operation.

The cards are inserted through an insertion slot 12 of the machine 10, and they can come out again after customizing through a slot 14. In practice, it would be difficult to have the cards enter and come out by the same slot.

The card 16 is driven by rollers towards a position in which it can be imprinted by a thermal print head 20. In this position, the card is bent by an impression cylinder 30. The print head is placed facing a part of the cylinder against which the card is applied. For example, the cylinder is in a low position when the card is inserted, and rises in bending the card when said card is in position.

The print head 20 is mounted in a pivoting position and gets applied against the convex face of the card, with the interposition of an inking ribbon 40 between the head and the card, whenever a line of dots has to be printed. The head is controlled electronically for the selection, at each line, of the dots that have to be printed and of those dots that do not have to be printed, according to a conventional principle of printing by aligned dots.

At each new line to be printed, the card moves forward by one step beneath the print head.

When the printing is finished, the card is shifted to another position, always inside the machine, where the electrical customization is done. For this customization, an electrical writing head 50 can come into contact with the electrical connector (not shown in the figures) provided on the card and connected to the chip contained in the card. This head 50 must be capable of rising to let through the card from its printing position towards its electrical customizing position, then from this position to the exit. It must descend only during the electrical customization stage.

Figure 2:
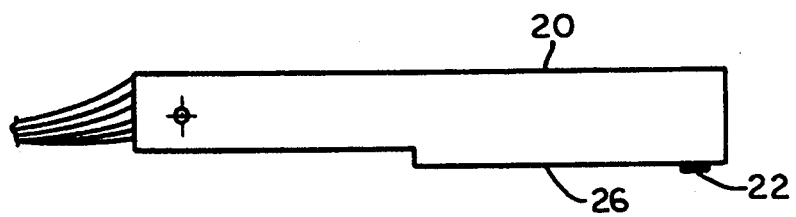
FIG. 2 shows a prior art graphic print head in a side view.
Figure 3:
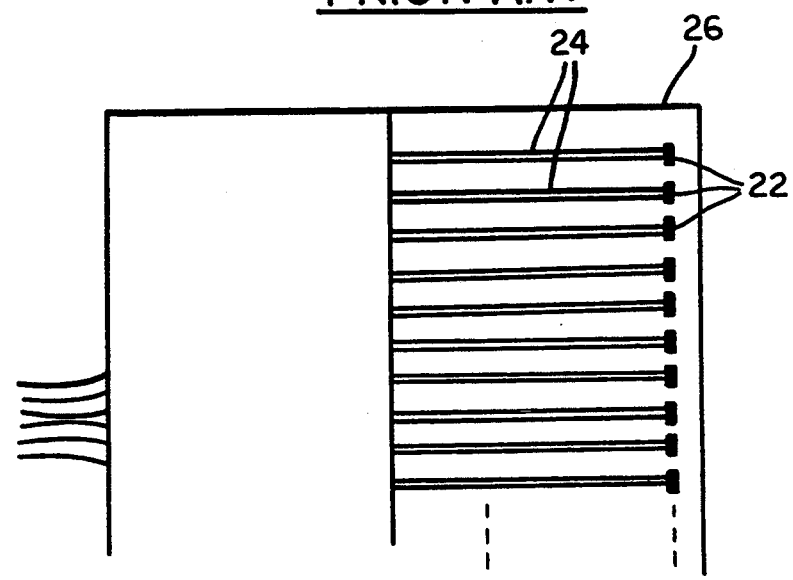
FIG. 3 shows a top view of the head of FIG. 2.

The graphic print head 20 used in these machines is shown schematically in a side view in FIG. 2 and in a bottom view in FIG. 3. It is a heat transfer head comprising a series of heating elements placed in line. In FIG. 2, all that is seen is the end of this line, hence only one heating element 22 placed at the end of the line. FIG. 3 shows the aligned heating elements 22 with their electrical connections 24. Heating elements and electrical connections are, for example, silk-screen printed on the lower plane surface of a support 26 (made of ceramic for example).

When the print head functions, the entire plane surface on which the heating elements are deposited gets applied against the card (the inking ribbon being interposed between the head and the card); since the card is bent, it is seen to it that the line of heating elements is applied against a generatrix of the cylinder formed by the card (preferably at the position of the maximum bend), the heating elements will be perfectly applied and the printing will be well done. Indeed, the support 26 comes into contact with the card only on this generatrix and not on its entire lower surface.

Figure 4:
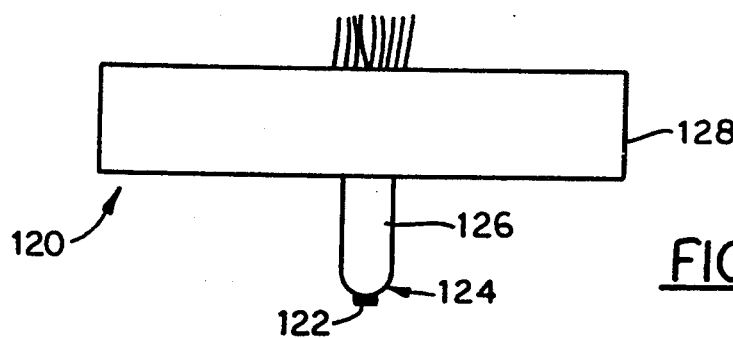
FIG. 4 shows a side view of a print head used in the invention.
Figure 5:
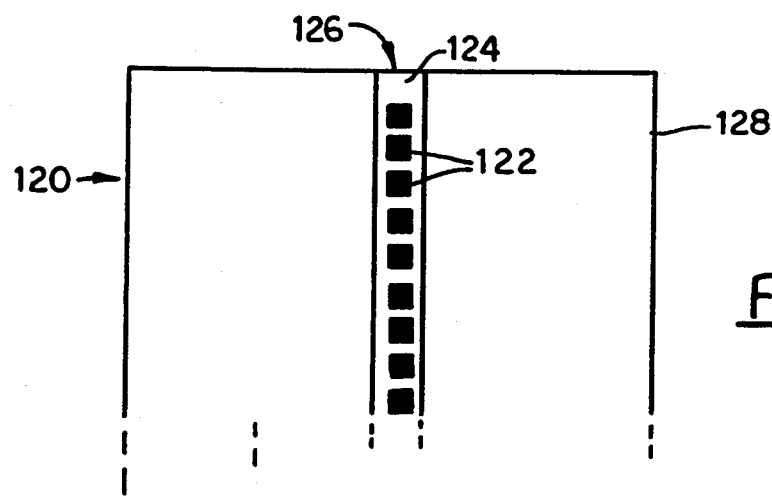
FIG. 5 shows a view from underneath of the head of FIG. 4.

FIG. 4 shows a print head of the type that it is proposed to use in the present invention, in a side view. FIG. 5 shows this head in a view from the bottom.

This head 120 is called a "vertical print head" owing to its structure. It comprises a main support 128 from which there is a downward extension (assuming that the card to be imprinted is placed beneath the head) of a thin, elongated plane secondary support 126. The secondary support juts out throughout its length with respect to the main support.

At the lower end of the main support on its elongated edge 124, there are positioned the heating elements 122. These elements are aligned with one another.

The edge 124 is preferably rounded to facilitate the contact of the heating elements with the card through the inking ribbon. The rounded feature is cylindrical (it may or may not be semi-circular) having its generatrix lines parallel to the direction in which the edge stretches (i.e. the direction in which the heating elements are aligned).

With a head such as this, it is no longer necessary to bend the card. This prevents strains in the card and makes it far easier:

for the card to pass from a print position to a position of electrical customization;

to use a standard card reader (and not a movable reading head) to carry out the electrical customization.

Figure 6:
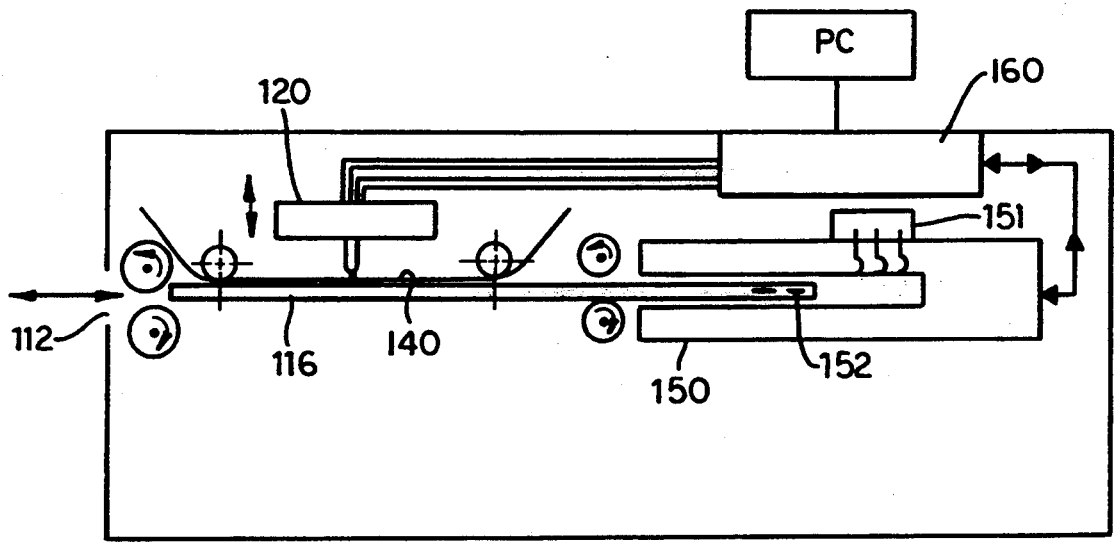
FIG. 6 shows a schematic view of the machine according to the invention.

The card customizing machine that results therefrom is shown schematically by way of an example in FIG. 6.

It includes an enclosure having a single slot 112 for the insertion and removal of a chip card 116. Means (drive rollers positioned before and after the head 120 for example) are mounted in the enclosure to shift the card flat (level and without bending) towards its print position (under the head 120) and then towards its electrical customization position (these two positions may be one and the same if means are provided to shift the print head in relation to the card during the electrical customization).

A standard card reader 150 receives the card 116 in its position of electrical customization. This is a standard reader, with a frictionless insertion connector: the arrival of the card at its limit of travel trips contacts 151 that get applied to the corresponding external contacts 152 of the card. The reader with its connector preferably meets the international ISO 7816-3 standards and enables the customizing of microprocessor cards working asynchronously as well as synchronous cards.

A command electronic circuit 160 controls the card reader 150 and the thermal print head 120. This command electronic circuit can itself be driven by a personal microcomputer PC. The driving of the card reading machine and print head (mechanical controls, graphic customization and electrical customization) is done by means of sub-programs in order to facilitate the integration of this machine into a system of customization.

The thermal print head 120 is placed above the card 116 in its printing position and an inking ribbon 140 is placed between the head and the card, with a holding and driving system of rollers to apply the ribbon at the right place and make the ribbon move past as and when it is used. The line of heating elements 122 of the head 120 is directed in parallel to the plane of the card and perpendicularly to the feed direction of said card moves forward (at least when the print head is generally fixed above the path of the card, for then the card shifts step by step for line by line printing). Step-by-step feed means for the card are designed to carry out the line-by-line printing. If the length of the print head 120 does not cover the entire width to be printed on the card 116 while it is moving past, then it can be seen that several successive passages will have to be made by shifting the head 120 laterally to place it on a new surface of the card to be printed.

Figure 7:
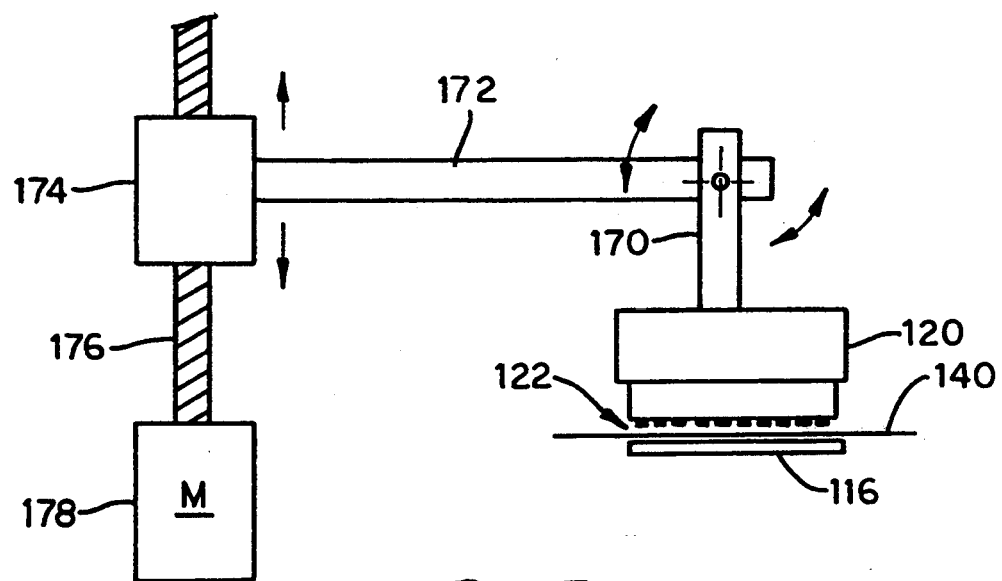
FIG. 7 shows a front view of the head, mounted in a pivoting position on an arm capable of shifting transversally to the plane of the card.

FIG. 7 shows an example of the assembly of the thermal print head 120 of the customizing machine according to the invention. The head 120 is mounted at the end of an arm 170 mounted in a pivoting position on another arm 172, the pivoting axis being parallel to the surface of the card 116 and perpendicular to the line of heating elements 122, so that this line can be applied accurately against the card 116 even if the plane of this card is not perfectly perpendicular to the direction in which the print head descends and rises at each printing step.

The arm 172 is itself mounted fixedly on a saddle 174 that is movable in translation perpendicularly to the surface of the card 116. This saddle is mounted, for example, on an endless screw 176 that is rotationally driven by a motor 178. The head 120 descends and rises whenever it is sought to make the card 116 go forward without any risk of rubbing the head on the card.

The print head 120 will be driven by the microcomputer PC of FIG. 6, with a software program that enables the types of ribbons, the types of card materials and, naturally, the graphic and electrical information elements relating to the customization for each individual card to be taken into account. The software programs include notably programs to print characters or stored images.

Thus, a description has been made of combined electrical and graphic customizing machine that is far more efficient, cheaper and more advantageous in many points than prior art machines (notably greater speed of operation when loading and unloading, no problems of positioning the card beneath a reading head, no strain on the card, etc.).

What is claimed is:

1. An automatic machine for the graphic and electrical customization of a chip card characterized in that it comprises:

a graphic print head (120) of the type comprising heating elements (122) located on an edge of a thin support, the graphic prim head is mounted on means (170, 172, 174) that can be used to raise it or lower it perpendicularly and linearly with respect to the surface of the chip card, a card reader (150) provided with means to carry out the electrical customization;

means for the relative shifting of the chip card in a flat position without bending, line by line, beneath the graphic print head (120) with reference to the graphic print head in its printing position, then with reference to the card reader, and a single introduction slot (112) for the insertion and removal of a chip card (116), a connector of said card reader being arranged such that an arrival of the chip card at its limit of travel causes a tripping of contacts of said connector which get applied to corresponding external contacts of the chip card.

2. Machine according to claim 1, characterized in that the vertical head is mounted in a pivoting state so that the edge which bears the heating elements can be applied accurately throughout its length against the chip card.

3. Machine according to claim 1, characterized in that the edge of the thin support (126) which bears the heating elements has rounded edges.

4. Machine according to claim 1, characterized in that there is only one line of heating elements on the edge.

5. An apparatus for the graphic and electrical customization of a chip card having electrical contacts thereon, said apparatus comprising:

an enclosure having a single introduction slot formed therein for the insertion and removal of a chip card;

a graphic print head mounted in said enclosure and including a thin support, and heating elements mounted on an edge of said thin support;

means for mounting said graphic print head in said enclosure so as to raise and lower said graphic print head perpendicularly and linearly with respect to said chip card from an inoperative position to a reading position;

means for conveying said chip card into and out of said enclosure through said introduction slot and for shifting said chip card within said enclosure, without bending said chip card, such that said chip card passes, line by line, beneath said graphic print head when said graphic print head is in said reading position; and a card reader which is positioned in said enclosure, which receives said chip card, and which has means for carrying out an electrical customization on said chip card, and electrical contacts which are tripped by said contacts on said chip card upon a forward limit of its travel into said card reader.

6. An apparatus as defined in claim 5, wherein said vertical support head is mounted in said enclosure by a pivot mechanism such that said edge of said thin support can be applied accurately throughout its length against said chip card.

7. An apparatus as defined in claim 5, wherein said edge of said thin support has rounded edges.

8. An apparats as defined in claim 5, wherein there is only one line of heating elements on said edge of said thin support.

9. An apparatus for the graphic and electrical customization of a chip card, said apparatus comprising:
an enclosure having an introduction slot formed therein for receiving a chip card;
a graphic print head which is positioned in said enclosure and which includes
a support,
heating elements mounted on an edge of said support, and
means for driving said support and said heating elements to move perpendicularly and linearly with respect to the surface of said chip card;
a card reader which is positioned in said enclosure, which receives said chip card, and which has
means for carrying out an electrical customization on said chip card, and
a frictionless insertion connector; and
a conveyor which conveys said chip card through said introduction slot and which shifts said chip card within said enclosure, without bending said chip card, such that said chip card passes, line by line, beneath said graphic print head and is printed by said graphic print head and is also customized by said card reader.

10. An apparatus as defined in claim 9, wherein said vertical support head is mounted in said enclosure by a pivot mechanism.

11. An apparatus as defined in claim 10, wherein said pivot mechanism comprises a first arm movable perpendicularly to the surface of said chip card and a second arm (1) on which said graphic print head is mounted, (2) which is mounted on said first arm, and (3) which is pivotable about an axis which is parallel to the surface of said chip card.

12. An apparatus as defined in claim 9, wherein said edge of said support has rounded edges.

13. An apparats as defined in claim 9, wherein there is only one line of heating elements on said edge of said support.

14. An apparatus as defined in claim 9, wherein said conveyor is level with said introduction slot and shifts said chip card horizontally within said enclosure between said introduction slot, said graphic print head, and said card reader.

15. An apparatus as defined in claim 14, wherein said conveyor comprises first and second drive rollers positioned before and after said graphic print head, respectively.

16. An apparatus as defined in claim 9, wherein said graphic print head is positioned between said card reader and said introduction slot.

17. An apparatus as defined in claim 9, wherein said frictionless insertion connector comprises electrical contacts which are mounted on said card reader and which are tripped by contacts on said chip card upon a forward limit of its travel into said card reader.

18. An apparatus as defined in claim 17, further comprising a command electronic circuit which controls said card reader and said graphic print head.

19. An apparatus as defined in claim 18, further comprising a personal microcomputer which drives said command electronic circuit.

20. An apparatus for the graphic and electrical customization of a chip card, said apparatus comprising:
an enclosure having an introduction slot formed therein for receiving a chip card;
a graphic print head which is positioned in said enclosure and which includes
a support, and
heating elements mounted on an edge of said support;
a card reader which is positioned in said enclosure, which receives said chip card, and which has
a device which carries out an electrical customization on said chip card, and
a frictionless insertion connector; and
a conveyor which conveys said chip card through said introduction slot and which shifts said chip card within said enclosure, without bending said chip card, such that said chip card passes, line by line, beneath said graphic print head and is printed by said graphic print head and is also customized by said card reader; wherein
said graphic print head is mounted in said enclosure by a pivot mechanism which comprises a first arm movable perpendicularly to the surface of said chip card and a second arm (1) on which said graphic print head is mounted, (2) which is mounted on said first arm, and (3) which is pivotable about an axis which is parallel to the surface of said chip card, and wherein said pivot mechanism further comprises
a saddle on which said first arm is fixedly mounted,
an endless screw on which said saddle is mounted, and
a motor which drives said screw to rotate into said card reader.

* * * * *